United States Patent [19]
Thoulon

[11] Patent Number: 5,488,628
[45] Date of Patent: Jan. 30, 1996

[54] METHOD AND APPARATUS FOR TRANSITION ENCODING A LOGIC SIGNAL

[75] Inventor: Pierre-Yves Thoulon, Voreppe, France

[73] Assignee: Hewlett-Packard Company, Palo Alto, Calif.

[21] Appl. No.: 187,320

[22] Filed: Jan. 26, 1994

[30] Foreign Application Priority Data

Jan. 26, 1993 [FR] France ................... 93 00997

[51] Int. Cl.⁶ ..................................... H03K 7/04
[52] U.S. Cl. ............... 375/239; 370/10; 332/112
[58] Field of Search .......... 375/23; 370/8–10; 307/265, 234, 510; 332/112

[56] References Cited

U.S. PATENT DOCUMENTS

| | | | |
|---|---|---|---|
| 3,394,312 | 7/1968 | Pfeiffer et al. | 375/20 |
| 3,627,946 | 12/1971 | Inoue | 375/111 |
| 4,007,421 | 2/1977 | Lien | 375/34 |
| 4,136,258 | 1/1979 | Workman | 375/23 |

FOREIGN PATENT DOCUMENTS

2599572  12/1987  France .

Primary Examiner—Stephen Chin
Assistant Examiner—T. Ghebretinsae

[57] ABSTRACT

A known method for transition encoding a logic signal involves: recording for each of a succession of window periods, the position of occurence of a first transition of the logic signal during that window by noting a count value reached at the time the first transition occurs; indicating the status of the logic signal after this first transition by appropriately setting a first bit; and indicating the occurence of a second transition during the same window period by the setting of a second bit. In order to avoid wrong encodings resulting from the occurence of a third transition within the same window period, the present invention provides for the effect delaying of any such third transition until the start of the next window period.

9 Claims, 5 Drawing Sheets

METHOD AND APPARATUS FOR TRANSITION ENCODING A LOGIC SIGNAL

FIELD OF THE INVENTION

The present invention relates to a method and apparatus for transition encoding a logic signal that may have one of a plurality of discrete speeds up to a maximum speed, the ratio between said maximum speed and the immediately lower discrete speed being equal to 2; the invention further relates to a method and apparatus for decoding codewords produced by the aforesaid transition encoding method.

DISCUSSION OF THE PRIOR ART

It is often necessary for two data processing systems to exchange logic signals over a plurality of serial lines. If the two data processing systems are remote from each other, it is desirable to reduce the number of linking lines and, accordingly, the serial lines are usually multiplexed onto a single high-speed serial line. In this case, if it is desired to reproduce the form of the logic signals being multiplexed, then an appropriate sampling and encoding method must be employed to capture the timing of the transitions of the logic signals.

Various methods of encoding the transitions of a logic signal are known. One particularly efficient form of transition encoding is described in United States patent specification U.S. Pat. No. 4,136,258 for the case where the logic signal to be encoded may have one of a plurality of discrete speeds up to a maximum speed, the ratio between said maximum speed and the immediately lower discrete speed being equal to 2. More particularly, the transition encoding method disclosed in U.S. Pat. No. 4,136,258 involves recording for each of a succession of window periods, the position of occurence of a first transition of the logic signal being encoded in terms of a count value from an established reference, indicating the status of the logic signal after this first transition by appropriately setting a first bit, and indicating the occurence of any second transition of the logic signal within the same window period by the setting of a second bit; the count value, first bit and second bit together form a codeword encoding the form of the logic signal for the window period.

The transition-encoding method of U.S. Pat. No. 4,136,258 gains its efficiency by the use of the aforesaid second bit to encode a possible second transition, thereby requiring half as many codewords as similar methods not using this second bit. The use of the aforesaid second bit is possible because it can be assumed that if a second transition does occur then the logic signal must be operating at the maximum speed and this enables the second transition to be reliably added back in on decoding of the codeword to reconstitute the logic signal.

However, the transition-encoding method described in U.S. Pat. No. 4,136,258 suffers from the drawback that if a third transition should occur during any window period, it will result in an encoding error. The occurence of such a third transition is not an unlikely event as generally the timing of the individual bits of the logic signal will be subject to substantial variation.

It is an object of the present invention to overcome the above-noted drawback of the prior art.

SUMMARY OF THE INVENTION

According to one aspect of the present invention, there is provided a method of transition encoding a logic signal that may have one of a plurality of discrete speeds up to a maximum speed, the ratio between said maximum speed and the immediately lower discrete speed being equal to 2; the method comprising the steps of:

(a) repeatedly initializing a first counter at a frequency F approximately equal to one half of said maximum speed, the time between each initializing of the first counter constituting a window period; and (b) during each window period, generating a codeword representing the form of the logic signal during that period by effecting the following sub-steps:

(i) incrementing said first counter at a frequency $2qF$ where q is a positive integer setting encoding resolution;

(ii) detecting a first transition of the logic signal during the current said window period, reading the count value of the first counter at the occurrence of said first transition, and setting the state of a first bit to permit the state of the logic signal after said transition to be derived therefrom;

(iii) detecting a possible second transition of the logic signal during the current window period, and setting the state of a second bit to indicate whether said second transition has occurred; and (iv) forming said codeword by arranging together, in any predetermined desired order, said count value, said first bit and said second bit;

characterised in that said method further involves effectively delaying any third transition of the logic signal during the current window period until the beginning of the next window period whereby such third transition is treated as the first transition for said next window period.

Preferably, in order to avoid certain further encoding ambiguities that might otherwise arise because of the bit timing variation encountered in the real world, step (b) comprises the further sub-steps of:

initializing a second counter at the occurrence of the first transition of the logic signal, said counter being clocked at frequency $2qF$; and setting said second bit to indicate the occurrence of a said second transition only if this second transition occurs when the content of the second counter is lower than a maximum value corresponding to the maximum time duration of a bit transmitted at the maximum speed.

Advantageously, once the second counter has reached said maximum value, any further transition of the logic signal occurring during the current window period is delayed until the beginning of the next window period.

Preferably, codewords generated according to the foregoing method are decoded to generate an output signal that corresponds at least approximately to the form of said logic signal, according to the following steps:

(a) repeatedly initializing a decode counter at said frequency F, the time between each initializing of the decode counter constituting a decode period; and (b) during each decode period, decoding a corresponding codeword by the following sub-steps:

(i) incrementing said decode counter at a frequency $2qF$;

(ii) comparing the count value of the decode counter with the count value contained in the current said codeword and, if and when both values are equal, setting said output signal to a state corresponding to the state indicated by said first bit contained in the current codeword; and (iii) comparing the count value of the decode counter with the said count value of the codeword, increased by q, and, if and when both values are equal, toggling the state of said output signal if said second bit contained in the current codeword is set to indicate the occurrence of a said second transition.

According to another aspect of the present invention, there is provided apparatus for transition encoding a logic signal that may have one of a plurality of discrete speeds up to a maximum speed, the ratio between said maximum speed and the immediately lower discrete speed being equal to 2; said apparatus comprising:

(a) a first counter that is repeatedly initialized at a frequency F approximately equal to one half of said maximum speed, the time between each initializing of the first counter constituting a window period, and said first counter being incremented during each said window period at a frequency 2 qF where q is a positive integer setting the resolution of encoding;

(b) a transition detecting circuit for providing a pulse at each transition of the logic signal;

(c) a transition counting circuit for counting the pulses produced by said transition detecting circuit during a said current window period;

(d) first storage means for storing the count value reached by the first counter during a current said window period upon said transition counting circuit indicating the occurrence of a first transition during that period;

(e) second storage means for storing a first bit and setting it, upon the occurrence of a said first transition, to a state permitting the state of the logic signal after said transition to be derived therefrom;

(e) third storage means for storing a second bit which is reset at the beginning of each window period and is set by the transition counting circuit upon the latter recording a second said transition during the current window period; and (f) means for forming a codeword at the end of a said current window period by arranging together, in any predetermined desired order, the contents of said first, second and third storage means, said codeword representing the form of the logic signal during that period; characterised in that said apparatus further comprises selective delay means for delaying any third transition of the logic signal that would otherwise occur during a said current window period, until the beginning of the next window period whereby such third transition is treated as the first transition for said next window period.

Preferably, the logic signal is fed to said transition detecting circuit through said selective delay means, the latter being responsive to the state of the said second bit stored in said third storage means, to freeze the state of the logic signal for the remainder of the said current window period when the state of the said second bit indicates the occurrence of a second transition of the logic signal during a said current window period.

Advantageously, the apparatus of the invention further comprises:

a second counter that is incremented at frequency 2 qF and initialized upon said transition counting circuit indicating the occurrence of a first transition during a said current window period;

a comparator for comparing the count value of the second counter with a preset value corresponding to the maximum time duration of a bit transmitted at the maximum speed, whereby to provide a signal that is set in an active state if the count value of the second counter is lower than said preset value; and means for freezing the state of the logic signal for the remainder of the said current window period when the signal provided by the comparator is otherwise than in its active state.

Apparatus may also be provided for decoding codewords generated by the method of the invention whereby to generate an output signal that corresponds at least approximately to the form of said logic signal; such apparatus preferably comprises:

(a) a decode counter that is repeatedly initialized at said frequency F, the time between each initializing of the decode counter constituting a decode period, said decode counter being incremented at a frequency 2 qF during each said decode period;

(b) means for providing during each succesive said decode period, a corresponding said codeword, hereinafter the current codeword, to be decoded during that period;

(c) a first comparator for comparing the count value of the decode counter with the count value of the current codeword, and for providing a signal that is enabled if and when both said values are equal;

(d) an adder for adding q to the value of the count value contained in said current codeword;

(e) a second comparator for comparing the value of said decode counter with the output value of said adder and providing a signal that is in an enabled state if and when both values are equal; and (f) a flip-flop for providing said output signal, said flipflop being:
  (i) set to a state corresponding to the state indicated by the said first bit of the current codeword, when the signal provided by the first comparator is enabled, and
  (ii) toggled when the signal provided by the second comparator is enabled and the second bit contained in the current codeword is set to indicate the occurrence of a said second transition.

BRIEF DESCRIPTION OF THE DRAWINGS

A transition encoding/decoding method acccording to the invention and transition encoding/decoding apparatus embodying the invention will now be particularly described by way of non-limiting example, with reference to the accompanying diagrammatic drawings.

DESCRIPTION OF THE PREFERRED EMBODIMENT

The method according to the invention is applicable to the case when the ratio between the maximum transmission speed of the line carrying the logic signal to be encoded and the immediately lower speed of the line equal to 2. Therefore, the method applies, except for some certain uncommon cases, to any standard serial link. According to the transition encoding method exemplified by the aforesaid U.S. Pat. No. 4,136,258, during each of a succession of windows having twice the width of a bit transmitted at the maximum possible speed, the position at which a transition of the logic signal to be encoded is ascertained and a check is also made as to whether a second signal transition occurs within the window. Then, a series of bits indicating the transition position, a bit indicating the state of the logic signal after the first transition, and an additional bit indicating whether a second transition has occurred or not within the window, are formed into a codeword. The number of possible transition positions q detected within a half-window, corresponding to a logic-signal bit transmitted at the maximum speed, determines the resolution of the reconstructed signal.

As a consequence, if the transition position is encoded by m codeword bits, where $q=2^m$ then only m+2 codewords bits (m position bits, 1 polarity bit, and 1 bit for encoding a possible second transition) are required to encode the logic signal during a window (each window corresponding to two successive bits transmitted at the maximum speed).

The encoding of a possible second transition with a single bit is possible due to the fact that, when such transition actually occurs, one knows that the signal is at its maximum transmission speed and that, theoretically, the time duration separating this second transition from the first transition is equal to one half of the width of the current window, that is, the second transition occurs q subdivisions after the first transition.

Figure 1:
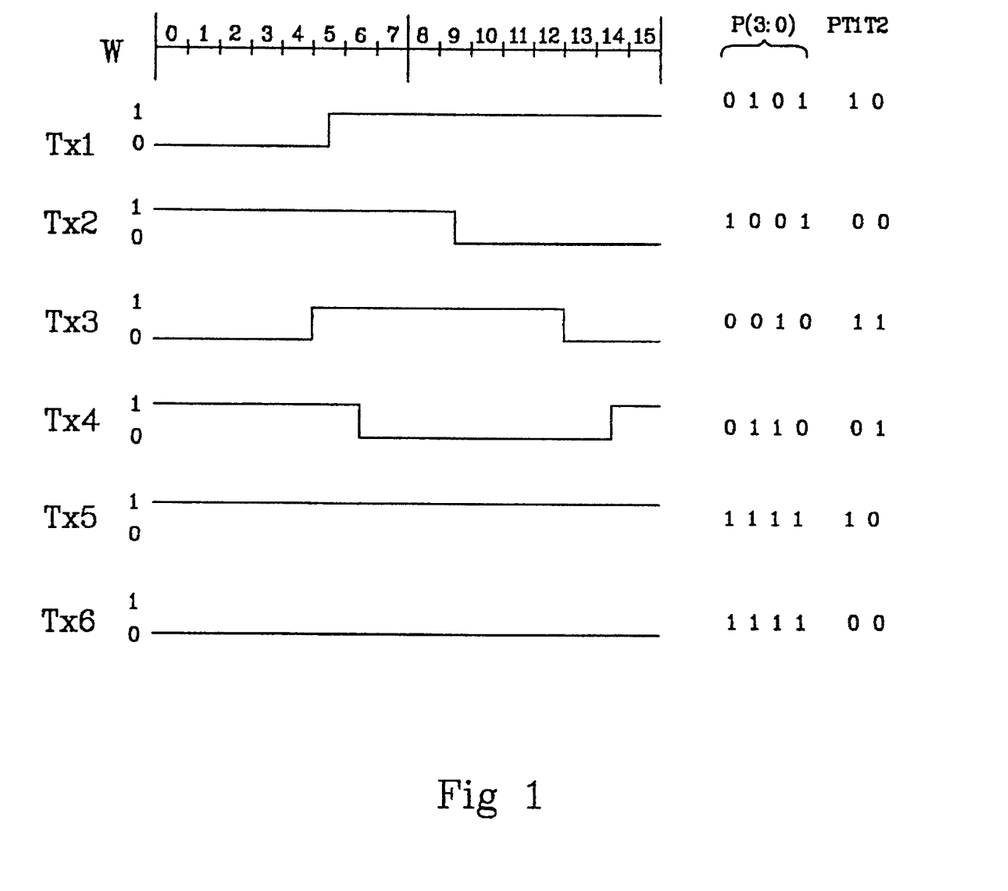
FIG. 1 illustrates a known transition encoding method by reference to various logic signal waveforms.

FIG. 1 illustrates the foregoing encoding method with reference to six possible waveforms Tx1–Tx6 of a logic signal occuring within a window W having a width equal to two bits at the maximum transmission speed of the logic signal under consideration. Window W is partitioned into 2q=16 intervals, or subdivisions, numbered from 0 to 15. Near each signal Tx, there is represented an encoding symbol including 4 position bits P(3:0) indicating in which subdivision of window W a transition of signal Tx occurs, a transition polarity bit PT1 indicating whether this transition is rising or falling, and a second-transition bit T2 indicating whether a second transition occurs within window W. (It may be noted that the transition polarity bit simply provides a means for determining the state of the logic signal after the transition and can, in fact, be considered as a direct indicator of this state).

Signals Tx1 and Tx2 have a single transition within window W; the corresponding bits T2 are at "0" to indicate the absence of a second transition. The transition of signal Tx1 is rising and occurs in subdivision 5; bits P(3:0) define the binary value 5 and bit PT1 is at "1" to indicate a rising transition. The transition of signal Tx2 is falling and occurs in subdivision 9; bits P(3:0) define value 9 and bit PT1 is at "0" to indicate a falling transition.

Each signal Tx3 and Tx4 has two transitions within window W; the corresponding bits T2 are at "1" to indicate that two transitions occurred within window W. The first transition of signal Tx3 is rising and occurs in subdivision 4; bits P(3:0) define value 4, and bit PT1 is at "1" to indicate that the first transition is a rising one. The first transition of signal Tx4 is a falling one and occurs in the subdivision 6 of window W; bits P(3:0) define value 6 and bit PT1 is at "0" to indicate that the first transition is a falling one.

Signals Tx5 and Tx6 are at a constant level, 1 and 0, respectively. The corresponding bits T2 are at "0" indicating the absence of the second transition, and the corresponding bits P(3:0) indicate a transition at the last subdivision 15. Bit PT1 for signal Tx5 is at "1", indicating a rising transition, and bit PT1 for signal Tx6 is at "0" indicating a falling transition. These encodings of signals Tx5 and Tx6 could be mistaken, respectively, for the encoding of a signal having a first rising transition in subdivision 15 and for the encoding of a signal having a first falling transition in subdivision 15. As will be seen hereinafter with reference with FIG. 6, this ambiguity is avoided during the decoding because the decoding method takes into account the prior state of a transition of a signal being reconstructed.

Figure 2A:
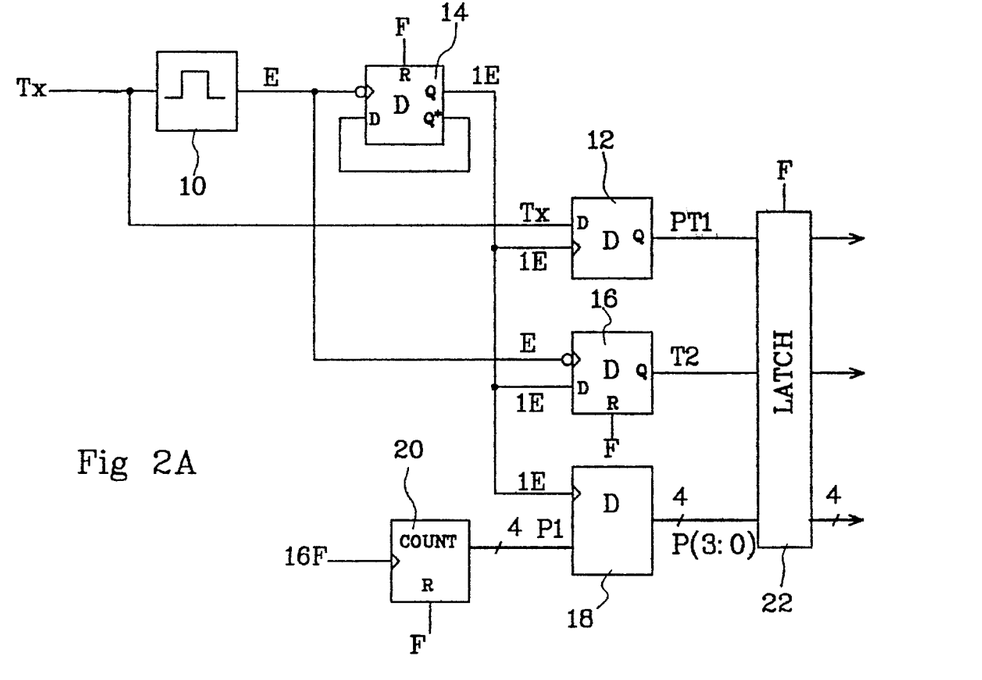
FIG. 2A represents a circuit for implementing the encoding method of FIG. 1.
Figure 2B:
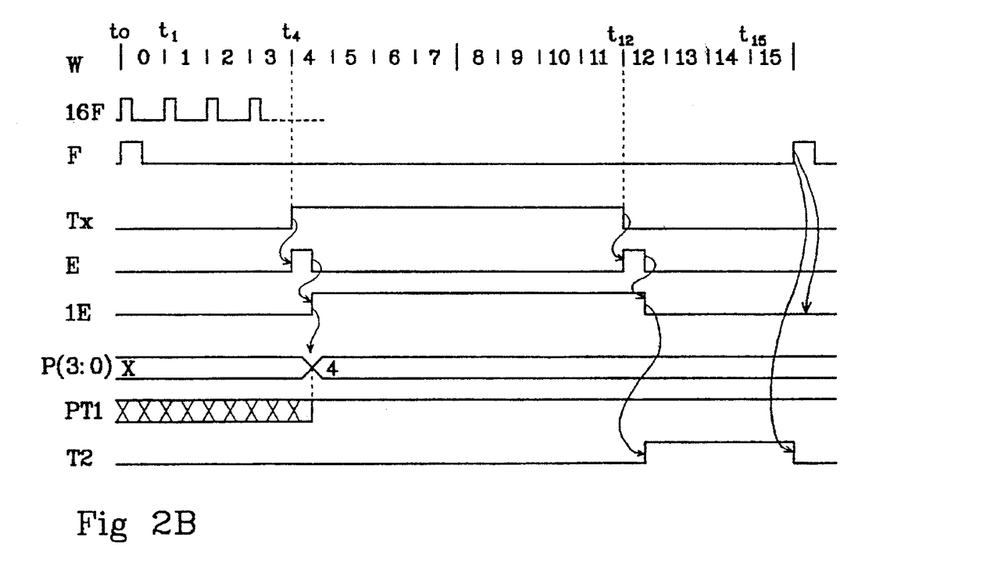
FIG. 2B is a timing diagram illustating the operation of the circuit of FIG. 2A.

FIGS. 2A and 2B respectively represent an embodiment of an encoding circuit implementing the method of FIG. 1 and a timing diagram illustrating the operation of the encoding circuit.

The logic signal Tx to be encoded is fed to the input of a transition detector 10 and to the data input of a D-type flip-flop 12. At the occurrence of each rising or descending transition of signal Tx, circuit 10 provides a pulse E to an inverted clock input of two D-type flip-flops 14 and 16 (flip-flops 14 and 16 are triggered by the falling edges of pulses E). Flip-flop 14 is configured as a divide-by-2 circuit, that is, its inverted output Q* is fed back to its data input D. Flip-flops 14 and 16 are reset by pulses F that successively occur at a frequency equal to one half the maximum speed of signal Tx (that is, the width of a window W is equal to the width of two bits transmitted at a maximum speed). Flip-flop 14 provides a signal 1E that indicates, when it is toggled to "1", that a single transition of signal Tx occurred since the last pulse F. Signal 1E is provided at the clock input of flip-flop 12, at the data input of flip-flop 16, and at the enabling input of a D-type flip-flop 18. Flip-flop 18 receives on four lines the content P1 of a counter 20 clocked by a signal 16F at the rate of 16 times the frequency of pulses F. Counter 20 is reset by pulses F. The outputs of flip-flops 12, 16 and 18 are provided to a latch 22 enabled by pulses F. Flip-flops 12, 16 and 18 respectively provide the bit PT1 indicating the polarity of the first transition, the bit T2 signalling the existence of a second transition, and data P(3:0) indicating the position of the first transition within a window.

FIG. 2B represents a timing diagram of the operation of the circuit of FIG. 2A for an exemplary waveform of signal Tx. In FIG. 2B is shown a measurement window W partitioned into 16 subdivisions numbered from 0 to 15 starting at times $t_0$–$t_{15}$. Each time $t_0$–$t_{15}$ corresponds to the rising edge of a clock pulse 16F that increments counter 20. Time $t_0$ corresponds to the rising edge of a pulse F; thus, a window W starts at each pulse F.

At time $t_0$, a first pulse F occurs that resets flip-flops 14, 16, and counter 20, and transfers to latch 22 data PT1, T2 and P(3:0) established in the preceding window. Signals Tx, E, 1E and T2 are at "0". Signal PT1 and value P(3:0) are at arbitrary states, set during the preceding window W.

At time $t_4$, a first rising transition of signal Tx occurs, triggering a first pulse E. The width of pulses E is less than the period of signal 16F, being equal, for example, to one half-period of signal 16F.

The falling edge of pulse E triggers flip-flops 14 and 16; signal 1E, provided by flip-flop 14, goes to "1", which indicates that a first transition occurred within window W; and the preceding state, 0, of signal 1E is transferred to the output T2 of flip-flop 16. In this event, signal T2 maintains its state "0".

The rising edge of signal 1E enables flip-flop 18 which then stores the content P1 of counter 20, here equal to 4; data P(3:0) goes to 4. The rising edge of signal 1E triggers flip-flop 12 which then stores the current state, 1, of signal Tx; data PT1 goes to 1 or remains at 1 depending on its preceding state.

At time $t_{12}$, a second, falling, transition of signal Tx occurs, triggering a new pulse E. The falling edge of pulse E re-triggers flip-flops 14 and 16; signal 1E goes to "0" and its preceding state, 1, is stored in flip-flop 16. Therefore, signal T2 goes to "1" to indicate the occurrence of a second transition within window W.

The next rising edge of signal F (at the beginning to of the next window W) transfers to latch 22 the values PT1, T2, and P(3:0) determined in the current window W and resets to zero the outputs 1E, T2, and P1 of flip-flops 14, 16 and of counter 20, respectively.

If the transitions of signal Tx at times $t_4$ and $t_{12}$ are respectively falling and rising, signals E, 1E, P(3:0), and T2 are identical, but signal PT1 goes to "0" instead of "1" in subdivision 4.

At each beginning of a window, the bits that have just been stored in latch 22 (and which constitute a codeword encoding the logic signal over the window that has just ended) are transmitted.

The above description addresses the theoretical case when the width of a bit transmitted at the maximum speed is equal to the inverse of this speed. But generally the width of a bit may vary within a range of ±33% of its nominal value. This variation may, for the two extreme transmission speeds, cause encoding errors.

Figure 3:
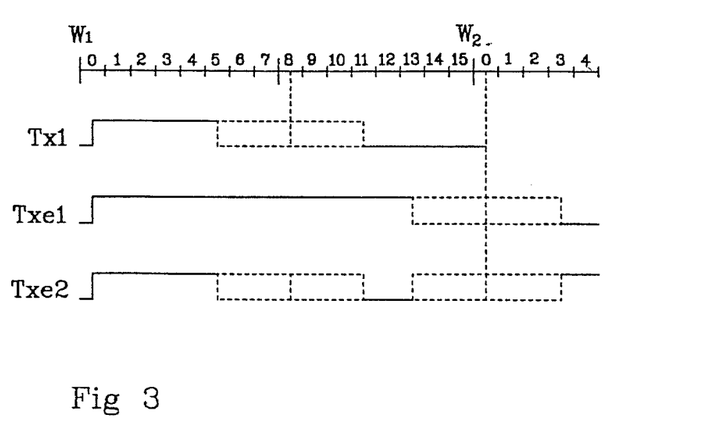
FIG. 3 illustrates variations about a nominal value of the width of a bit of a logic signal to be encoded.

FIG. 3 represents three exemplary logic signals Tx1, Txe1, and Txe2 with associated ranges of variation. Two signals, Txe1 and Txe2, may cause erroneous encoding. Each signal exhibits a transition, for example a rising transition, in subdivision 0 of a window W1; dotted lines indicate the areas where subsequent transitions of these signals may occur.

Signal Tx1 corresponds to a bit "1" followed by a bit "0" transmitted at the maximum speed. Normally, the falling transition of signal Tx1 occurs in subdivision 8 of window W1. A variation of ±33% may cause this second transition to occur between subdivision 5 and subdivision 11, approximately. Whatever the position of the second transition, signal Tx1 does not result in an erroneous encoding since the decompression method, as will be seen hereinafter, effectively reconstructs a signal corresponding to the transmission of a bit at "1" at the maximum speed.

Signal Txe1 corresponds to the successive transmission at the maximum speed of bits 1,1, 0. Since the transmission speed is theoretically precise within ±2%, an error in the width of the first transmitted bit is not added to an error of the second bit. The second transition of signal Txe1 may occur between subdivision 13 of window W1 and subdivision 3 of the next window W2. If the second transition occurs between subdivisions 0 and 3 of window W2, the reconstructed signal Txe1 has the same waveform as the original signal Txe1; no error occurs. However, if the second transition occurs within one of subdivisions 13–15 of window W1, signal Txe1 is encoded in the same manner as signal Tx1, which provides a reconstructed signal having a second bit set to "0" instead of "1".

Signal Txe1 could also correspond to the transmission of a bit "1" at a speed corresponding to one half of the maximum speed. The variation range is therefore twice the represented variation and there is a risk that the reconstructed signal may, if the initial bit is at its narrower width, have a corresponding bit with a width equal to one half the width it should have, but this bit will nevertheless generally be considered as a bit at "1" by a receiving circuit of the reconstructed signal. This problem is not encountered when the permitted variation is smaller than ±25%.

Signal Txe2 corresponds to the successive transmission of bits 1, 0 and 1, at the maximum speed. The second transition of signal Txe2, as for signal Tx1, may occur between subdivision 5 and subdivision 11 of window W1. A possible third transition, corresponding to a transmitted third bit at "1", may occur between subdivision 13 of window W1 and subdivision 3 of window W2. The reconstruction of the signal corresponding to window W1 is carried out without any error; however, the method of FIG. 1 does not detect a third transition within a window. Thus, if a third transition occurs in one of subdivisions 13–15 of window W1, this transition is not detected but it nevertheless causes signal 1E to be set to "1" and the content of counter 20 to be transferred again in flip-flop 18, thus providing an erroneous value P(3:0) at the end of window W1.

The present invention is concerned with correcting, in particular, errors resulting from the occurence of a third transition within a window, this being achieved by effectively delaying this transition to the next window. Furthermore, in a preferred embodiment of the invention, errors due to the late occurence of a second transition are also corrected, again by delaying the transition. To this end, in the preferred embodiment of the invention, the time elapsed since the first transition is compared with a maximum time duration corresponding to the permitted maximum width of a bit transmitted at the maximum speed (11 subdivisions of a window W). As long as the maximum time duration is not reached, the occurrence of a second transition is permitted. From the expiration of the maximum time duration, any occurrence of a transition is delayed until the beginning of the next window.

Figure 4A:
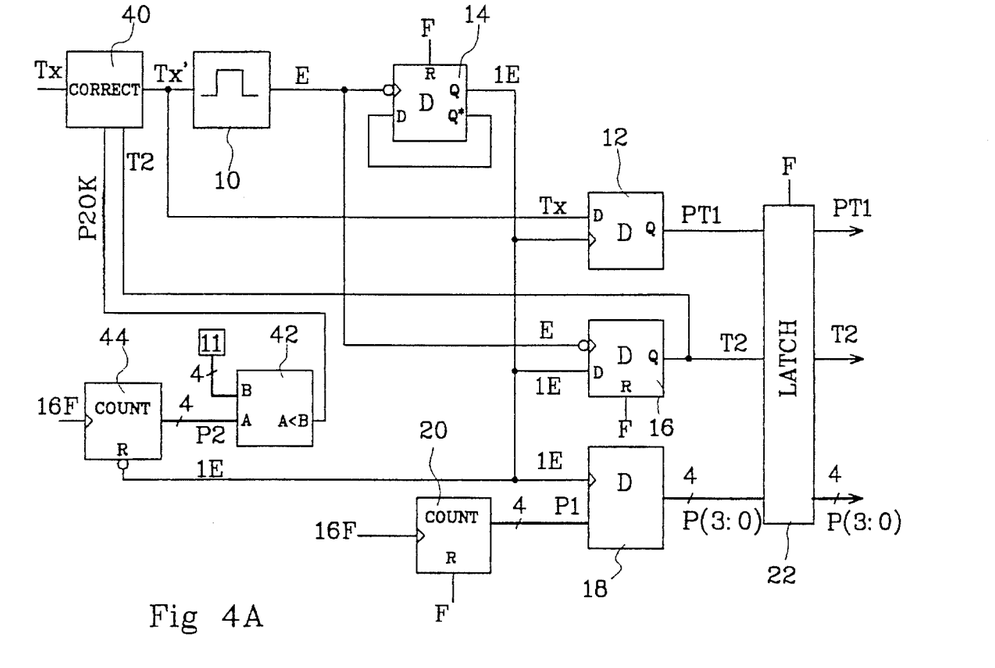
FIG. 4A illustrates a transition encoding circuit embodying the present invention taking into account variations such as the ones of FIG. 3.

FIG. 4A shows the preferred encoding circuit of the invention, this circuit corresponding to the circuit of FIG. 2A modified to correct the possible above-mentioned errors. Elements already represented in FIG. 2A are labeled with the same reference numerals. The transition detector 10 receives a signal Tx' corresponding to the signal Tx after processing by the correcting circuit 40. A comparator 42 receives at an input A the content of a 4-bit counter 44, and, at an input B, the value 11, binary coded. Counter 44 is clocked by the clock signal 16F and is reset by the falling edges of signal 1E. Comparator 42 provides at its output A<B a signal P2OK at an active state as long as the content P2 of counter 44 is smaller than 11. Signal P2OK and signal T2 are provided to the correcting circuit 40 that prevents signal Tx' from changing its state until the end of the current window after the first occurrence of a falling edge of signal P2OK or of a rising edge of signal T2.

Figure 4B:
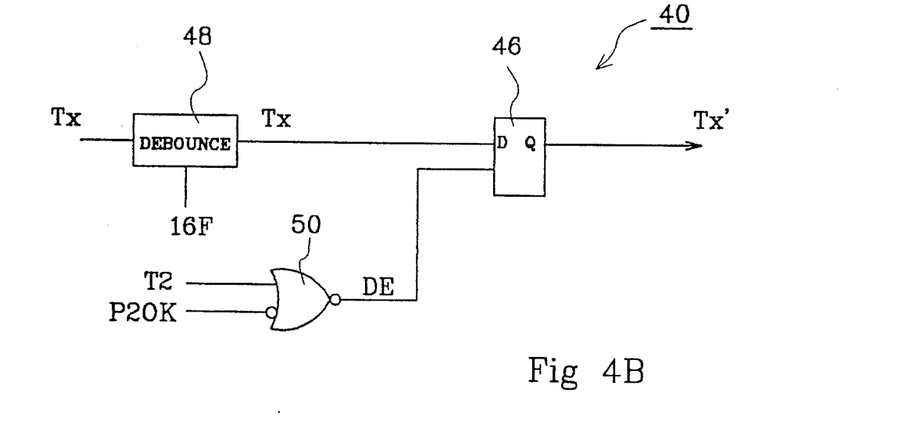
FIG. 4B shows in greater detail part of the FIG. 4A circuit.

FIG. 4B represents an embodiment of the correcting circuit 40. Signal Tx is provided at the data input of a latch 46 through a debouncing circuit 48 controlled by signal 16F. Signal Tx' is provided by output Q of latch 46. Signals T2 and P2OK are respectively provided to a direct input and to an inverted input of a NOR gate 50 that provides a transition delay signal DE at the enabling input of latch 46.

The debouncing circuit 48 is a conventional circuit that ignores every pulse of signal Tx having a time duration shorter than a predetermined number (for example 1) of periods of its clock signal 16F.

Figure 4C:
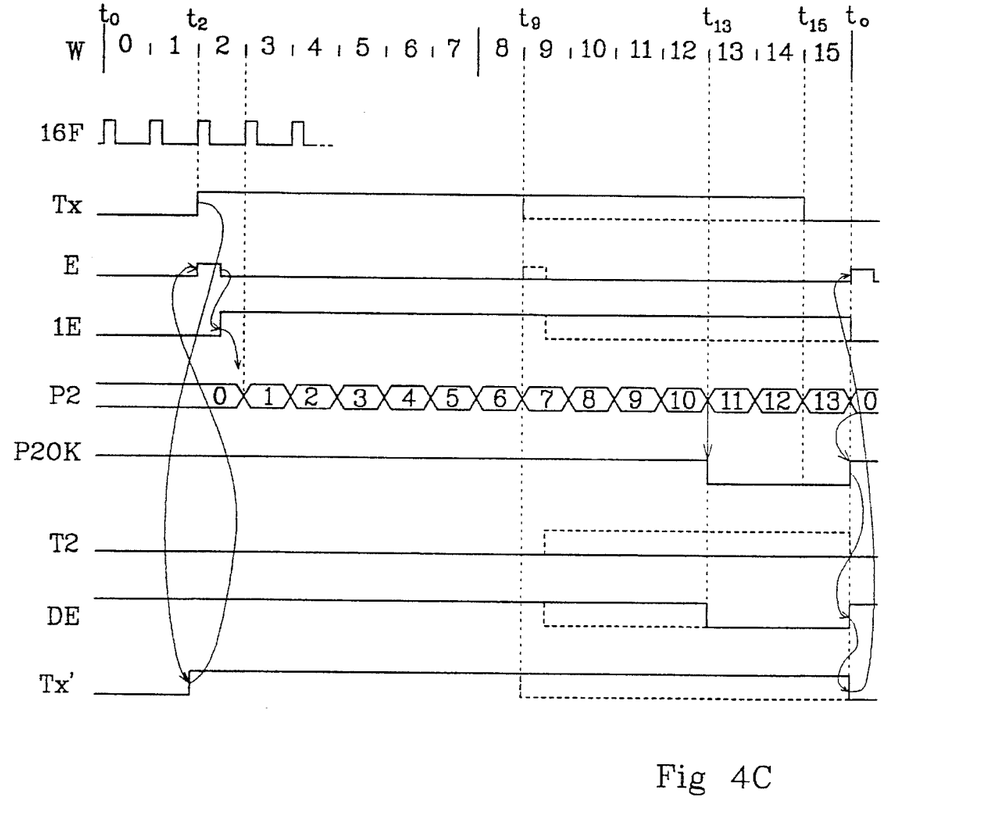
FIG. 4C is a timing diagram illustrating the operation of the FIG. 4A circuit.

FIG. 4C illustrates a timing diagram for the circuit of FIGS. 4A and 4B for a signal Tx exhibiting a belated second transition within a window W. FIG. 4C also shows the corresponding waveforms of signals 16F, Tx, E, 1E, P2OK, T2, DE, Tx', and the corresponding values P2 of counter 44.

A first rising transition of signal Tx occurs at time $t_2$, at the beginning of subdivision 2 of window W. (The transitions of signal Tx are synchronized with the clock 16F; this is generally obtained by a debouncing circuit). Signal P2OK and signal $T_2$ are at "1" and "0", respectively; hence, signal DE is at "1". The latch 46 transmits signal Tx as a signal Tx' as long as its enabling signal DE is at "1". As a result, a rising transition of signal Tx' occurs at time $t_2$, thus triggering a pulse E. The falling edge of pulse E causes signal 1E to go to "1" The rising edge of signal 1E, in subdivision 2, releases counter 44 that starts counting at the rate of signal 16F. Counter 44 goes to "1" at the beginning of subdivision 3.

At time $t_{13}$, the second transition of signal Tx has not occurred yet whereas the state of counter 44 reaches value 11. Comparator 42 sets signal P2OK to "0", which causes signal DE to go to "0". The content of latch 46 is locked and the state of signal Tx' no longer changes whatever the state of signal Tx.

At time $t_{15}$, the second falling transition of signal Tx occurs. This transition does not affect signal Tx' since the latch 46 is locked. Since the state of signal Tx' does not change at time $t_{15}$ of the second transition of signal Tx, a pulse E is not generated and the state T2 of flip-flop 16 remains unchanged.

At the beginning, $t_0$, of the next window, counter 44 is reset, which causes signal P2OK to go to "1", which in turn causes signal DE to go to "1" The state 1 of signal DE enables latch 46, and signal Tx' takes on the current state "0" of signal Tx. The resulting falling transition of signal Tx' is taken as a first transition within the window through triggering of a pulse E.

Dotted lines show the waveform of signals when the second transition of signal Tx occurs at time t9, for example. Since the latch 46 is still enabled at time $t_9$ (the content P2 of counter 44 has not yet reached value 11), signal Tx' goes to "0" simultaneously with signal Tx. A pulse E is triggered by this transition of signal Tx' and its falling edge causes signal 1E to go to "0". Then, signal T2 goes to "1", causing signal DE to go to "0", and therefore latch 46 to be locked. Thus, a possible third transition of signal Tx will only be accounted for when latch 46 is enabled again, that is, at the beginning t0 of the next window when signal T2 is reset by a pulse F.

Figure 5:
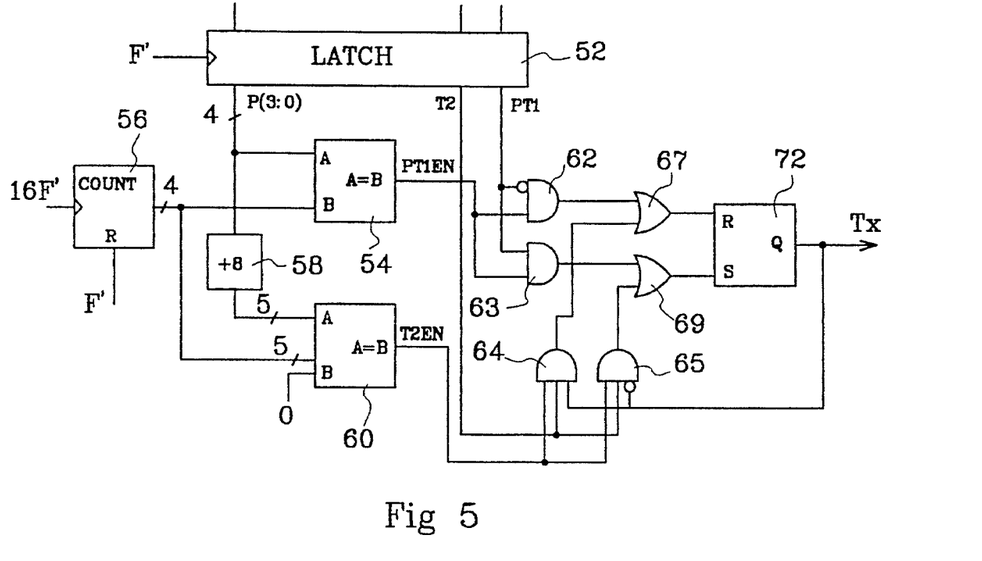
FIG. 5 represents a decoding circuit for decoding codewords produced by the encoding method of the invention.

FIG. 5 represents an embodiment of a decoding circuit for decoding codewords generated according to the method of the invention. The decoding circuit includes a latch 52 enabled by a signal F' having a frequency equal to the frequency of the above-mentioned signal F. The successive periods of signal F' correspond to successive windows W. Codewords to be decoded are successively transferred into latch 52; each codeword comprises bits corresponding to value P(3:0), and the bits PT1 and T2. Value P(3:0) is provided to an input A of a comparator 54 having an input B that receives the content of a 4-bit counter 56 clocked by a signal 16F' having a frequency equal to the frequency of the above-mentioned signal 16F. Counter 56 is periodically reset through pulses of signal F'. Comparator 54 provides to an output A=B an enabling signal PT1EN that is active when the content of counter 56 is equal to value P(3:0). The sum of value P(3:0) and of the binary value 8 (i.e., the resolution) is provided by an adder 58, on five lines, to an input A of a comparator 60. The content of counter 56 is provided on four least significant lines to an input B of comparator 60, the fifth most significant line of input B being connected to a level "0".

Comparator 60 provides at an input A=B an enabling signal T2EN that is enabled when the content of counter 56 is equal to the sum P(3:0)+8. The output of comparator 54 is provided at a first input of two AND gates 62 and 63. The output of comparator 60 is provided at a first input of two AND gates 64 and 65. The bit T2 stored in latch 52 is provided at a second input of gates 64 and 65. The bit PT1 stored in latch 52 is provided at an inverting input of gate 62 and at a forward input of gate 63. The outputs of gates 62 and 63 are respectively connected to a first input of two OR gates 67 and 69. The outputs of gates 64 and 65 are respectively connected to a second input of gates 67 and 69. The output of gate 67 is connected to a resetting input R of an RS flip-flop 72. The output of gate 69 is connected to a setting input S of flip-flop 72. The output Q of flip-flop 72 provides the reconstructed signal Tx and is connected to a third input of gate 64 and to a third inverting input of gate 65.

The circuit of FIG. 5 operates as follows. During a first pulse F', indicating the beginning of a period or window W, counter 56 is reset and values P(3:0), T2 and PT1 are set in latch 52. Counter 56 starts to count at the rate of pulses 16F' and its content reaches value P(3:0) at a given time. Then, signal PT1EN is enabled, which causes either the setting of flip-flop 72 if bit PT1 is at "1", or the resetting of flip-flop 72 if bit PT1 is at "0". The first transition of signal Tx is thus reconstructed. Counter 56 continues to count and may reach the sum P(3:0)+8. If this sum is not reached prior to the next pulse F', the first transition of the original signal Tx has occurred during the second half of a window; the portion of signal Tx corresponding to the current window W has been fully reconstructed. If sum P(3:0)+8 is reached, signal T2EN is enabled by comparator 60. Then, if bit T2 is at "0", which indicates that a single transition of the original signal Tx has occurred, signal Tx remains unchanged. If bit T2 is at "1", the content of flip-flop 72 is inverted, that is, the content is reset through gates 67 and 64 if it was initially at "1", or is set through gates 69 and 65 if it was initially at "0". Thus, the second edge of signal Tx is reconstructed. This decoding method is repeated at each pulse of signal F' through the resetting of counter 56 and enabling of latch 52.

Figure 6:
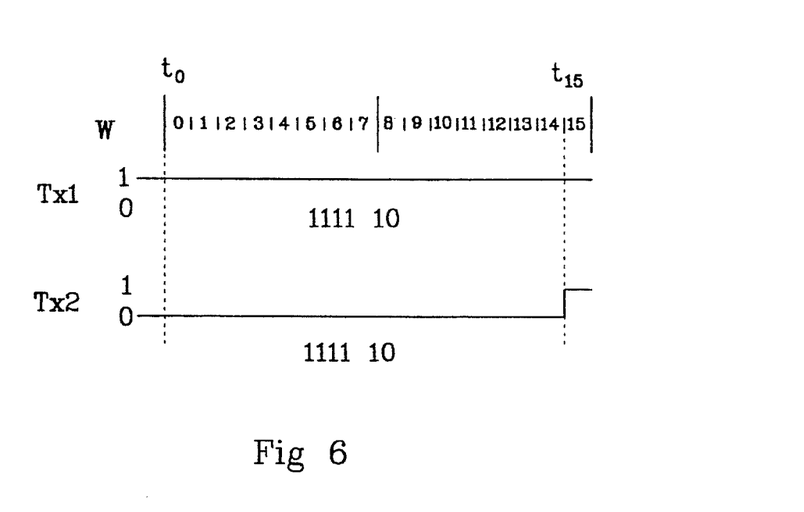
FIG. 6 illustrates the manner in which the circuit of FIG. 5 avoids an encoding ambiguity of the encoded information.

FIG. 6 illustrates the reconstruction of two different signals Tx1 and Tx2 from a same content, or same encoding, of latch 52. FIG. 6 shows how the decoding circuit of FIG. 5 avoids the ambiguity indicated with reference to FIG. 1 when the values of bits P(3:0), PT1 and T2 are 1111 10 or 1111 00. FIG. 6 only shows the case of value 11111 10, the ambiguity for value 1111 00 being avoided in the same manner.

Signal Tx1 is at "1" at time to at the beginning of a window W. Counter 56 reaches value 1111 at time $t_{15}$. Signal PT1EN is enabled and, bit PT1 being at "1", flip-flop 72 is set; thus, signal Tx1 constantly remains at value "1".

The state at time to of signal Tx2 is "0". At time $t_{15}$, counter 56 reaches value 1111, signal PT1EN is enabled and flip-flop 72 is set since bit PT1 is at "1". Signal Tx2 goes to "1" at time $t_{15}$.

Thus, FIG. 6 shows that the ambiguity associated with value 1111 of bits P(3:0) is avoided by the state at the beginning of the considered window, which is the state that was correctly found at the preceding window.

As is apparent to those skilled in the art, various modifications can be made to the above preferred embodiments, more particularly for the implementation of the method according to the invention with the use of logic circuits.

I claim:

1. A method of transition encoding a logic signal that may have one of a plurality of discrete speeds up to a maximum speed, the ratio between said maximum speed and the immediately lower discrete speed being equal to 2; the method comprising the steps of:

(a) repeatedly initializing a first counter at a frequency F approximately equal to one half of said maximum speed, the time between each initializing of the first counter constituting a window period; and (b) during each window period, generating a codeword representing the form of the logic signal during that period by effecting the following sub-steps:

(i) incrementing said first counter at a frequency 2 qF where q is a positive integer setting encoding resolution;

(ii) detecting a first transition of the logic signal during a current window period, reading a count value of the first counter at the occurrence of said first transition, and setting the state of a first bit to permit the state of the logic signal after said transition to be derived therefrom;

(iii) detecting a possible second transition of the logic signal during the current window period, and setting the state of a second bit to indicate whether said second transition has occurred; and (iv) forming said codeword by arranging together, in any predetermined desired order, said count value, said first bit and said second bit;

said method further involving effectively delaying any third transition of the logic signal during said current window period until the beginning of a next window period whereby such third transition is treated as the first transition for said next window period.

2. A method according to claim 1, wherein step (b) comprises the further sub-steps of:

initializing a second counter at the occurrence of the first transition of the logic signal, said counter being clocked at frequency 2 qF; and setting said second bit to indicate the occurrence of said second transition only when this second transition occurs when the content of the second counter is lower than a maximum value corresponding to the maximum time duration of a bit transmitted at the maximum speed.

3. A method according to claim 2, wherein once said second counter has reached said maximum value, any further transition of the logic signal occurring during the current window period is delayed until the beginning of the next window period.

4. A method according to claim 1, wherein said first counter is a k-bit counter, and wherein q=2k−1.

5. A method according to claim 1, further comprising the step of decoding the codeword to generate an output signal that corresponds at least approximately to the form of said logic signal; said decoding includes the steps of:

(a) repeatedly initializing a decode counter at said frequency F, the time between each initializing of the decode counter constituting a decode period; and (b) during each decode period, decoding a corresponding codeword by the following sub-steps:

(i) incrementing said decode counter at a frequency 2 qF;

(ii) comparing a count value of the decode counter with the count value contained in the current said codeword and, when both values are equal, setting said output signal to a state corresponding to the state indicated by said first bit contained in the current codeword; and (ii) comparing the count value of the decode counter with the said count value of the codeword, increased by q, and, when both values are equal, toggling the state of said output signal when said second bit contained in the current codeword is set to indicate the occurrence of a said second transition.

6. Apparatus for transition encoding a logic signal that may have one of a plurality of discrete speeds up to a maximum speed, the ratio between said maximum speed and the immediately lower discrete speed being equal to 2; said apparatus comprising:

(a) a first counter that is repeatedly initialized at a frequency F approximately equal to one half of said maximum speed, the time between each initializing of the first counter constituting a window period, and said first counter being incremented during each said window period at a frequency 2 qF where q is a positive integer setting the resolution of encoding;

(b) a transition detecting circuit for providing a pulse at each transition of the logic signal, (c) a transition counting circuit for counting the pulses produced by said transition detecting circuit during a current window period;

(d) first storage means for storing the count value reached by the first counter during said current window period upon said transition counting circuit indicating the occurrence of a first transition during that period;

(e) second storage means for storing a first bit and setting it, upon the occurrence of a said first transition, to a state permitting the state of the logic signal after said transition to be derived therefrom;

(e) third storage means for storing a second bit which is reset at the beginning of each window period and is set by the transition counting circuit upon the latter recording a second transition during the current window period; and (f) selective delay means for delaying any third transition of the logic signal that would otherwise occur during a said current window period, until the beginning of the next window period whereby such third transition is treated as the first transition for said next window period; and (g) means for forming a codeword at the end of said current window period by arranging together, in any predetermined desired order, the contents of said first, second and third storage means, said codeword representing the form of the logic signal during that period.

7. Apparatus according to claim 6, wherein said logic signal is fed to said transition detecting circuit through said selective delay means, the latter being responsive to the state of the said second bit stored in said third storage means, to freeze the state of the logic signal for the remainder of said current window period when the state of the said second bit indicates the occurrence of said second transition of the logic signal during said current window period.

8. Apparatus according to claim 6, further comprising:

a second counter that is incremented at frequency 2 qF and initialized upon said transition counting circuit indicating the occurrence of said first transition during said current window period;

a comparator for comparing the count value of the second counter with a preset value corresponding to the maximum time duration of a bit transmitted at the maximum speed, whereby to provide a signal that is set in an active state when the count value of the second counter is lower than said preset value; and means for freezing the state of the logic signal for the remainder of said current window period when the signal provided by the comparator is other than in its active state.

9. Apparatus according to claim 6, further comprising a decoder for decoding the codeword to generate an output signal that corresponds at least approximately to the form of said logic signal; said decoder includes:

(a) a decode counter that is repeatedly initialized at said frequency F, the time between each initializing of the decode counter constituting a decode period, said decode counter being incremented at a frequency 2 qF during each said decode period;

(b) means for providing during each successive said decode period, a corresponding said codeword, hereinafter the current codeword, to be decoded during that period;

(c) a first comparator for comparing a count value of the decode counter with the count value of the current codeword, and for providing a signal that is enable when both said values are equal;

(d) an adder for adding q to the value of the count value contained in said current codeword;

(e) a second comparator for comparing the value of said decode counter with the output value of said adder and providing a signal that is in an enabled state when both values are equal; and (f) a flip-flop for providing said output signal, said flip-flop being:
  (i) set to a state corresponding to the state indicated by the said first bit of the current codeword, when the signal provided by the first comparator is enabled, and
  (ii) toggled when the signal provided by the second comparator is enabled and the second bit contained in the current codeword is st to indicate the occurrence of a said second transition.

* * * * *